US007302562B1

(12) United States Patent
Jacobson et al.

(10) Patent No.: US 7,302,562 B1
(45) Date of Patent: Nov. 27, 2007

(54) TRANSMITTING CONFIGURATION DATA TO A TARGET PROGRAMMABLE DEVICE AFTER UPDATING AN INTERMEDIATE PROGRAMMABLE DEVICE

(75) Inventors: Neil G. Jacobson, Los Altos, CA (US); Emigdio M. Flores, Jr., Coral Springs, FL (US); Sanjay Srivastava, San Jose, CA (US); Bin Dai, Mountain View, CA (US); Sungnien Mao, Fremont, CA (US); Rosa M. Y. Chow, Redwood City, CA (US); Pushpasheel Tawade, San Jose, CA (US); David E. Schweigler, Campbell, CA (US); Brian D. Erickson, Soquel, CA (US); Bernardo A. Elayda, III, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 390 days.

(21) Appl. No.: 10/981,931

(22) Filed: Nov. 5, 2004

(51) Int. Cl.
*G06F 7/38* (2006.01)
(52) U.S. Cl. .......................... 713/100; 326/37; 326/38; 716/16
(58) Field of Classification Search ................ 713/100; 716/16; 711/105; 326/37, 38
See application file for complete search history.

(56) References Cited

U.S. PATENT DOCUMENTS 6,408,432 B1 * 6/2002 Herrmann et al. .......... 717/139
6,789,255 B1 * 9/2004 Pedrizetti et al. ........... 717/169
7,000,161 B1 * 2/2006 Allen et al. ................. 714/725
7,047,352 B1 * 5/2006 Khu et al. ................... 711/103
7,081,771 B2 * 7/2006 Agrawal et al. .............. 326/38
7,081,773 B1 * 7/2006 May et al. .................... 326/38
7,082,540 B1 * 7/2006 Ruparelia et al. ........... 713/193
2002/0070753 A1 * 6/2002 Vogel et al. .................. 326/37

* cited by examiner

*Primary Examiner*—Thomas Lee
*Assistant Examiner*—Jaweed A Abbaszadeh
(74) *Attorney, Agent, or Firm*—LeRoy D. Maunu

(57) ABSTRACT

Method and system for a programmable device programmer. The disclosure describes various embodiments for programming a target programmable device by a programmer. In one embodiment, the programmer determines availability of updated configuration data for a hardware component of the programmer. The programmer includes the software component coupled to the hardware component. An update mode of the hardware component is enabled in response to availability of the updated configuration data, and programming of the target programmable device is disabled while the hardware component is in the update mode. A programmable device internal to the hardware component is programmed with the updated configuration data while the hardware component is in the update mode, and the update mode is disabled in response to completion of programming of the at least one programmable device. A target programmable device may then be programmed by the programmer having the updated configuration data.

35 Claims, 5 Drawing Sheets

US 7,302,562 B1

TRANSMITTING CONFIGURATION DATA TO A TARGET PROGRAMMABLE DEVICE AFTER UPDATING AN INTERMEDIATE PROGRAMMABLE DEVICE

FIELD OF THE INVENTION

The present invention generally relates to tools for configuring programmable devices.

BACKGROUND

Programmable devices such as a programmable logic device (PLD) may be configured to perform a wide variety of functions. A PLD may be configured or "programmed" to perform a particular function using data that configures the programmable logic and routing resources to implement a particular function. The configuration data loaded into the PLD may be loaded from a source external to the PLD.

There are a variety of tools available for programming a PLD from an external source. For example, the Parallel Cable IV tool from Xilinx connects the parallel port of a workstation or personal computer to the JTAG interface of the target system. This type of tool includes both software and hardware components. The software component executes on the user's workstation and controls the overall configuration process. The hardware component physically connects a port of the user's workstation to the targeted system and includes the cabling, connectors, and in some instances PLDs that implement a hardware level interface to the targeted system.

Programming tools (or "programmers" for short), such as the Parallel Cable IV tool, often support programming a number of different devices. This eliminates having a dedicated programmer for each different device. However, the programming interface of a device may change from one device generation to the next, which means the programmer may need to be updated. Thus, another programmer, perhaps specialized, may be needed to program the out-of-date programmer. In some programmers, the bus within the hardware component of the programmer may not be externally accessible. This means that in order to update the programmer some disassembly of the hardware may be required.

The present invention may address one or more of the above issues.

SUMMARY OF THE INVENTION

The invention includes various embodiments for programming a target programmable device by a programmer. In one embodiment, the programmer determines availability of updated configuration data for a hardware component of the programmer. The programmer includes the software component coupled to the hardware component. An update mode of the hardware component is enabled in response to availability of the updated configuration data, and programming of the target programmable device is disabled while the hardware component is in the update mode. A programmable device internal to the hardware component is programmed with the updated configuration data while the hardware component is in the update mode, and the update mode is disabled in response to completion of programming of the at least one programmable device. A target programmable device may then be programmed by the programmer having the updated configuration data.

In another embodiment, an apparatus is provided for programming the programmable device. The apparatus includes a software component executing on a host processor; a hardware component coupled to the host processor; means for determining availability of updated configuration data for a hardware component by a software component; means for enabling an update mode of the hardware component in response to availability of the updated configuration data; means for disabling the hardware component from programming the target programmable device in response to the update mode being enabled; means for programming at least one programmable device internal to the hardware component with the updated configuration data while the hardware component is in the update mode; means for disabling the update mode of the hardware component in response to completion of programming of the at least one programmable device; and means for programming the target programmable device including configuration data, wherein the target PLD is external to the hardware component.

In yet another embodiment, a programmer system is provided. The system includes a software component adapted to execute on a host computer. A hardware component is coupled to the software component and operable in one of an update mode and a normal mode responsive to control from the software component. The hardware component includes at least one programmable device and a target interface. The programmable device is adapted for programming by the software component in response to the hardware component operating in the update mode. The target interface is coupled to the at least one programmable device and is adapted to couple to the target programmable device. The target interface is further adapted to enable passing of configuration data to the target programmable device in response to the hardware component operating in normal mode and disable passing of configuration data in response to the hardware component operating in update mode. A path selector is coupled to the software component, the programmable device in the hardware component, and the target interface. The path selector is adapted to provide configuration data to the target interface via the at least one programmable device in response to the hardware component operating in normal mode and provide configuration data to the at least one programmable device in response to the hardware component operating in update mode.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In an example embodiment of the invention, a programmer for a target programmable device such as a programmable logic device (PLD) has a hardware component, referenced as the "programmer hardware," and a software component, referenced as the "programmer software." The programmer hardware is implemented using one or more programmable devices such as PLDs that may be different from the target PLD. In order to add features or fix defects in the programmer, the programmer hardware and/or the programmer software may need to be updated. An update mode of the programmer hardware allows the programmer hardware to be updated without physical intervention by a user of the programmer.

Figure 1:
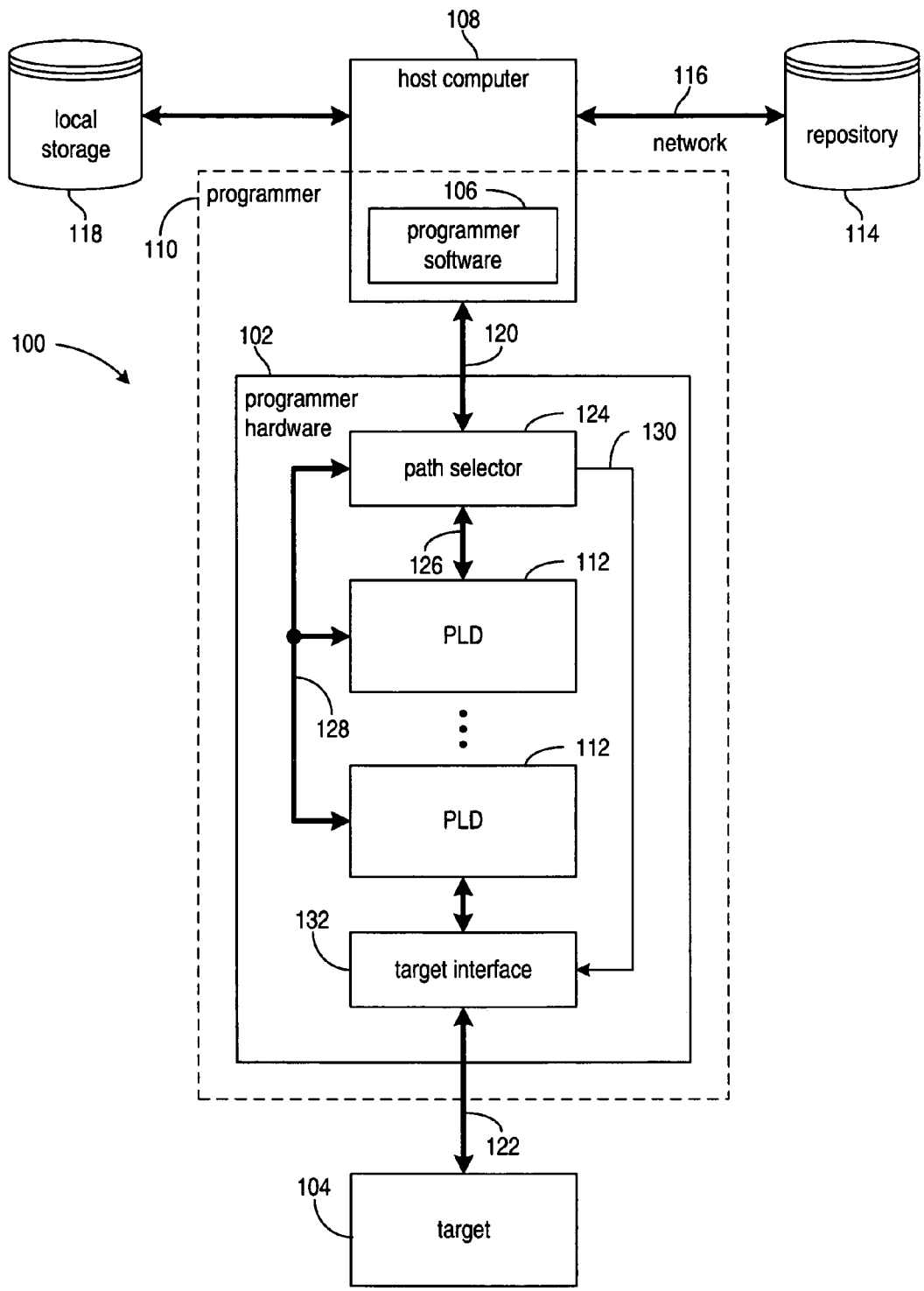
FIG. 1 is a block diagram of an example system with configurable programmer hardware, in accordance with one or more embodiments of the invention.

FIG. 1 is a block diagram of an example system 100 with configurable programmer hardware 102, in accordance with one or more embodiments of the invention. The programmer hardware 102 has a normal operating mode and an update mode.

The normal operating mode of the programmer hardware 102 conveys configuration data for a target PLD 104 between programmer software 106 on a host computer 108 and the target 104. The configuration data may be read by host computer 108 from local storage 118. In the normal operating mode, the programmer software 106 and the programmer hardware 102 cooperate to program the target 104. The programmer 110 is the combination of the programmer software 106 and the programmer hardware 102.

A function of the programmer hardware 102 is to convert configuration data received on lines 120 in a standard communication protocol, such as universal serial bus (USB), IEEE 1284 parallel port, or RS232, into the configuration data sent on lines 122 in the target 104 configuration protocol, such a Xilinx master serial, Xilinx SelectMAP, or IEEE 1149.1 JTAG scan. Another function of the programmer hardware 102 is to implement state machines that supply configuration data to target 104 according to the specific requirements of each type of target 104. Typically, one or more PLDs 112 are used to implement the programmer hardware 102, and these PLDs 112 are initially programmed during manufacture of the programmer hardware 102.

Due to certain factors, such as the production of a new generation of target PLD 104 or the discovery of defects in the programmer 110, the programmer 110 may require updating to support new features or fix the discovered defects. An update for the programmer 110 may require updating the programmer software 106, the programmer hardware 102, or both.

Partial disassembly of programmer hardware has been involved in updating PLD(s) in the programmer hardware. In some instances updating of the programmer hardware has been enabled with special switch settings. With the various embodiments of the invention, the programmer hardware 102 has an update mode that eliminates the need for user disassembly or user selection of switch setting(s) before updating the PLD 112 of programmer hardware 102. The update mode of the programmer hardware 102 allows the PLD 112 of the programmer hardware 102 to be updated by programmer software 106. During update mode, the PLD 112 effectively replaces the target PLD 104 as the destination for configuration data. That is, configuration data supplied to the programmer hardware is used to configure PLD 112, and thus the configuration data is not applied to target PLD 104. In one embodiment, special software on host computer 108 is used to update PLD 112 in update mode.

The update mode of the programmer hardware 102 permits the hardware 102 and software 106 of the programmer 110 to be updated in an atomic operation. For example, the programmer software 106 may periodically check for the availability of programmer 110 updates from a repository 114 located on a network 116, such as the internet. A user of host computer 108 may be prompted to approve acceptance of an available update. When an update is available, the update may be downloaded from the repository 114 to local storage 118.

The update for programmer 110 may contain both replacement software for programmer software 106 and replacement configuration data for PLD 112. The update mode of the programmer hardware 102 may be used to update the configuration of PLD 112 with the replacement configuration data using the replacement software for programmer software 106 followed by replacing programmer software 106 with the replacement software. It will be appreciated that either the replacement software or the replaced software for programmer software 106 may be used to program the PLD 112 with the replacement configuration data, depending on the particular updated features. Also, the update for the programmer 110 may contain certain components of the programmer software 106 and/or certain portions of the configuration data for PLD 112.

The programmer hardware 102 is switched between normal operating mode and update mode, and vice versa, by the programmer software 106 sending special signaling or a special instruction to the path selector 124 of the programmer hardware 102. The state of the path selector 124 is modified by the special signaling or the special instruction, such that configuration data normally sent over internal path 126 in normal operating mode is diverted to update path 128 in update mode. The PLD 112 used in programmer hardware 102 may use IEEE 1149.1 JTAG scan for the update path 128. In update mode, programmer software 106 may program PLD 112 by sending appropriate configuration data to the PLD 112 via path selector 124 and update path 128. In one embodiment, programmer software 106 may additionally read the current configuration data from the PLD 112.

In update mode, path selector 124 may assert a control signal on line 130 to target interface 132. The assertion of the control signal may cause target interface 132 to put lines 122 into an inactive state, such as a high impedance state, to isolate target 104 during update of programmer hardware 102.

The special signaling or special instruction used to enter update mode may be enabled by a coded key sequence or a password for security to prevent unintentional or unauthorized entry into update mode. The special signaling or special instruction to exit update mode may be similarly protected.

Figure 2:
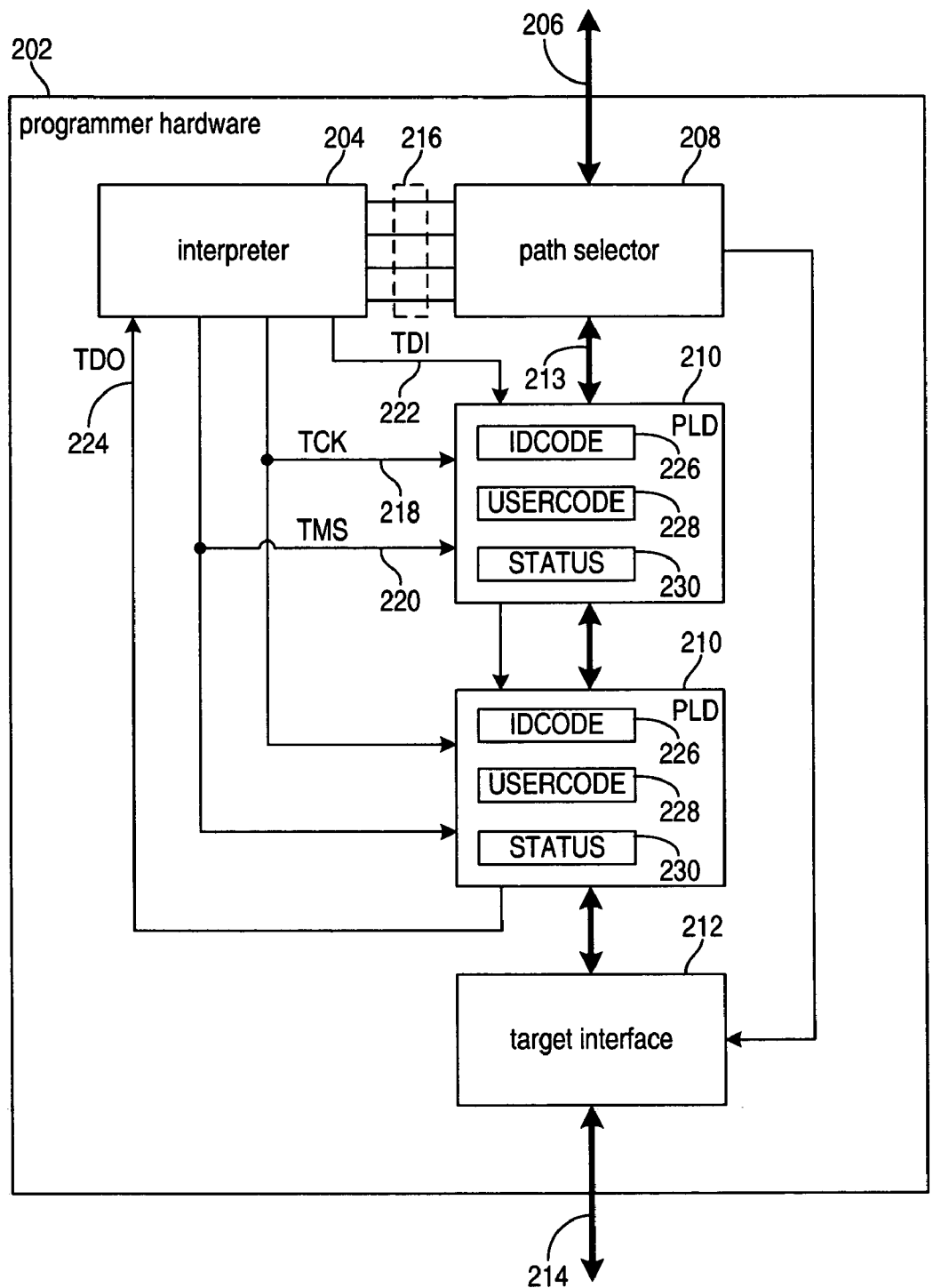
FIG. 2 is a block diagram of example programmer hardware including an interpreter for configuring the programmer hardware.

FIG. 2 is a block diagram of example programmer hardware 202 including an interpreter 204 for configuring the programmer hardware 202. The configuration data supplied on lines 206 from programmer software (not shown) is directed by path selector 208 to interpreter 204 in an update mode for path selector 208. In a normal operating mode for path selector 208, configuration data supplied on lines 206 is directed via PLD 210 and target interface 212 to a target PLD (not shown) via lines 213 and 214.

The interpreter 204 has the capability to process decision points included in the configuration data for PLD 210. Thus, the configuration data supplied to interpreter 204 may include control flow information in addition to the programmed configuration for PLD 210. The configuration data may be provided to interpreter 204 in serial vector format (SVF) or a derivate of SVF, such as Xilinx serial vector format (XSVF). SVF or XSVF may contain decision points, such as an equality test, that cause branching of control flow when interpreted by interpreter 204.

The configuration data including control flow information is supplied to interpreter 204 via lines 216 from a path selector 208 in update mode. Lines 216 may adhere to the IEEE 1149.1 JTAG scan protocol or another communication protocol. The interpreter 204 may program PLD 210 via IEEE 1149.1 JTAG scan on lines 218, 220, 222, and 224. The interpreter 204 may have a disabled operating mode, in which lines 216 are directly coupled to lines 218, 220, 222, and 224, to allow programming of PLD 210 without interpretation. During update mode when the interpreter 204 is active, lines 216 are controlled by the programming software via path selector 208 and lines 218, 220, 222, and 224 are independently controlled by interpreter 204.

The configuration data may cause interpreter 204 to read the IDCODE 226 of the PLD 210. The IDCODE 226 of a PLD 210 may be set during manufacture of the PLD 210 to reflect the type of PLD 210 as given by a PLD 210 part number and revision code. The control flow of the configuration data may have a decision point that causes the interpreter 204 to check whether the IDCODE 226 matches the expected type of PLD 210. The interpreter 204 may branch, such that the programming of PLD 210 is skipped, when the IDCODE 226 is incorrect.

The configuration data may cause interpreter 204 to additionally read the USERCODE 228 of the PLD 210. By convention, the USERCODE 228 of a PLD 210 may be set during each programming of the PLD 210 to reflect the function and revision code for the function programmed in the PLD 210 by the configuration data. The control flow of the configuration data may have a decision point that causes the interpreter 204 to check whether the USERCODE 228 matches an expected value. The interpreter 204 may branch, such that the programming of PLD 210 is skipped, when the USERCODE 228 is not for a matching function or is for a matching function, but unexpectedly for a newer revision of the matching function.

After checks, such as the IDCODE 226 and USERCODE 228 checks, the PLD 210 may be programmed by interpreter 204 during update mode with updated configuration data. The USERCODE 228 may be updated during configuration to reflect the new revision code for the programmed function of the configuration data.

After programming PLD 210, the configuration data may cause interpreter 204 to read a check value from PLD 210, such as a value for status register 230. The configuration data may provide error detection and error correction capabilities, such as including one or more cyclic redundancy check (CRC) values used to detect corruption of the configuration data received by the PLD 210. The PLD 210 may check that the included CRC values match expected values recalculated by PLD 210 over the configuration data actually received by PLD 210. The PLD 210 may set the status register 230 to reflect unsuccessful programming for a CRC check failure caused, for example, by data corruption, signal glitches, or electrical noise.

The control flow of the configuration data may have a decision point that causes the interpreter 204 to check whether the status register 230 indicates programming success. For successful programming, the interpreter 204 may return an indication of the successful programming of PLD 210 to the programming software. For unsuccessful programming, the interpreter 204 may return an indication of the unsuccessful programming of PLD 210 to the programming software, and interpreter 204 or the programming software may abort the update and take corrective action to restore operation of the programming hardware 202.

In one example of corrective action taken in response to a programming failure, an alternative image of configuration data is stored locally in the programmer hardware 202 in non-volatile storage. The alternative image may be used to configure the PLD 210 of the programmer hardware 202 in response to an error indication in the status register 230. In one embodiment, the alternative image may be an image of the configuration data existing in PLD 210 before the programming attempt or a generalized back-up image having limited functionality. The alternative image may provide an identification code, such as a corresponding value for USERCODE 228, to ensure compatible and correct operation of the programmer hardware 202 by the programmer software.

Another approach for corrective action is to provide a separate, non-updateable section of the programmer hardware 202 with back-up circuitry that is switched into operation only upon update failure. An identification code may be provided to indicate the capabilities, perhaps limited, of the programmer hardware. An end user may also be alerted to contact customer support for further assistance on an update failure.

Figure 3:
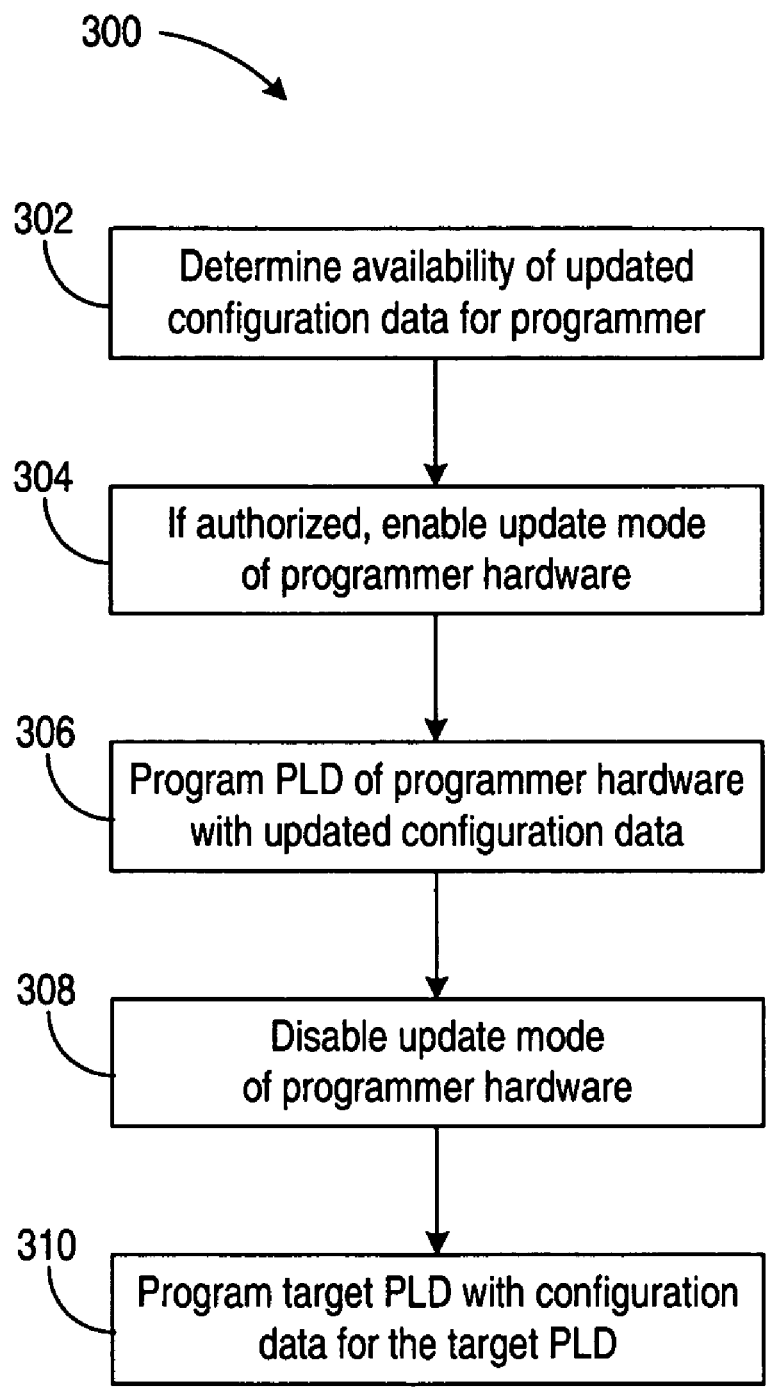
FIG. 3 is a flow diagram of a process for configuring programmer hardware, in accordance with one or more embodiments of the invention.

FIG. 3 is a flow diagram of a process 300 for configuring programmer hardware, in accordance with one or more embodiments of the invention. The programmer hardware includes one or more PLDs that are programmed during configuration of programmer hardware. The programmer hardware may be configured with updated configuration data, for example, to fix discovered defects in the programmer hardware, to allow programming of a new generation of target PLD not supported by the existing programmer hardware configuration, or to add new features to the programmer hardware.

At step 302, an updated configuration for the programmer hardware is determined to be available. A license controller may be queried to determine whether the update is authorized, the authorization being made in response to payment for added functionality, for example. An update to fix discovered defects may be marked to allow the update to be performed without a query to the license controller. An update to add new features to the programmer hardware may cause a license controller to check whether the features have been enabled for the programmer hardware. If the features have not been enabled, the update is not allowed or a user is queried to determine whether the user wants to purchase the new features. If the features have been enabled, the license controller may provide a coded key sequence or password that enables the update. Alternatively, the coded key sequence or the password may be provided by a user. At step 304, an update mode is enabled for the programmer hardware using special signaling or special instructions that may be protected by the coded key sequence or the password.

One or more PLDs in the programmer hardware are programmed with the updated configuration data at step 306. In one embodiment, the updated configuration data is sent to the PLD essentially unmodified to program the PLD. In another embodiment, the updated configuration data is interpreted by an interpreter included in the programmer hardware to generate the data used to program the PLD.

After completing the programming of the PLD in the programming hardware, the update mode is disabled at step 308 for the programmer hardware using special signaling or special instructions that may be protected by a coded key sequence or a password. With update mode disabled, the programming hardware returns to a normal operating mode used to program a target PLD. At step 310, the target PLD is programmed with configuration data using the programming hardware having the updated configuration.

Figure 4:
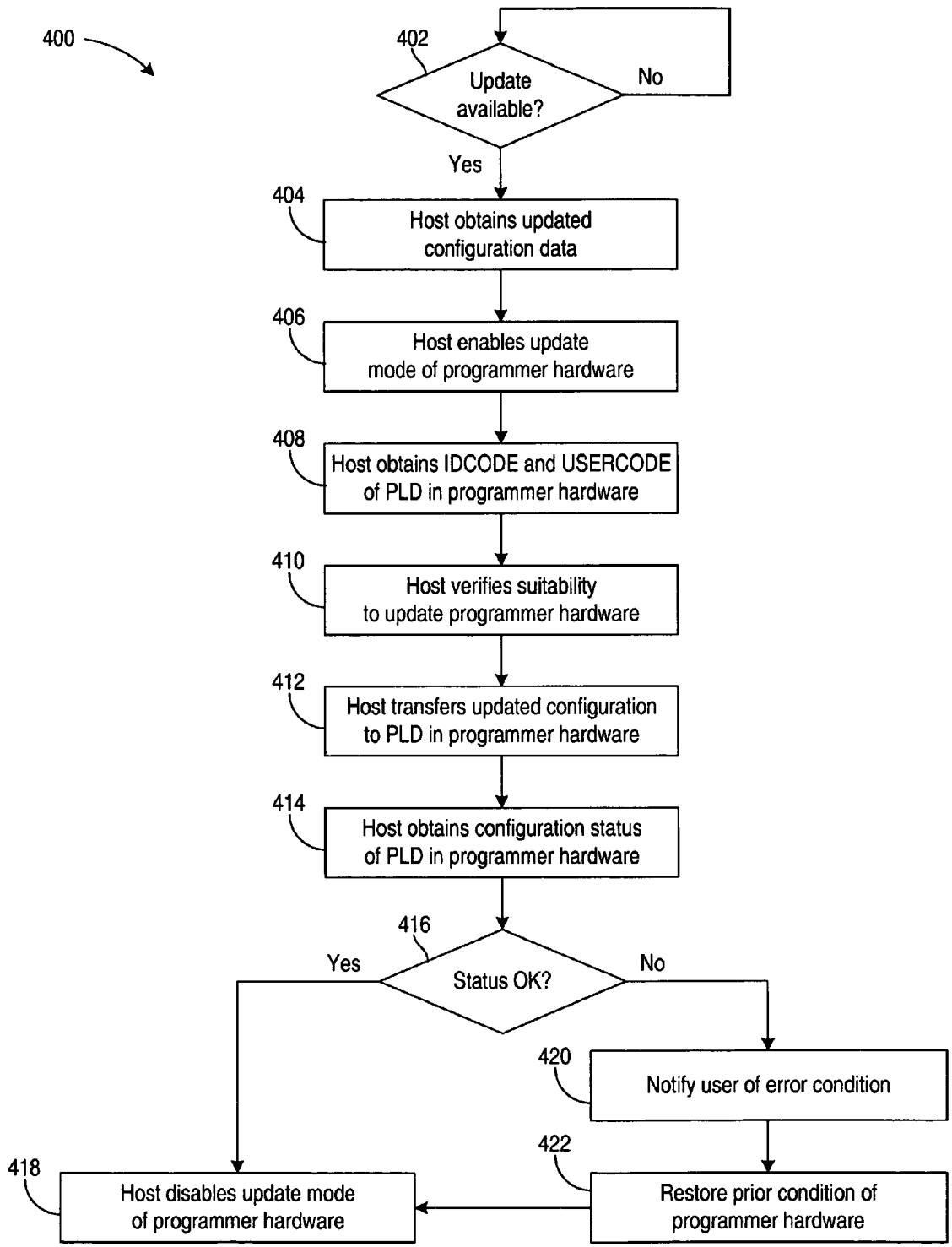
FIG. 4 is a flow diagram of a process for host controlled configuring of programmer hardware, in accordance with one or more embodiments of the invention.

FIG. 4 is a flow diagram of a process 400 for host controlled configuring of programmer hardware, in accordance with one or more embodiments of the invention. The programming of PLD in the programmer hardware is managed by programmer software executed by a host computer.

The programmer software may check for updated configuration for the programmer hardware at step 402. The programmer software may in local storage maintain a copy of the latest known version for the configuration data for the programmer hardware. A version number for the configuration data in local storage may be periodically compared to the version number of configuration data in a repository, such as network storage or software installation media. When the repository is determined by the version number comparison to have updated configuration data, the programmer software may download the updated configuration data to local storage at step 404. The check for updated configuration data may be made, for example, each time the programmer software is invoked, on request by a user of the host computer, each time communication is established between the programmer software and the programmer hardware, at regular intervals, or each time communication is established with a target PLD.

In addition, update of the programming hardware may occur when programming hardware is coupled to the host computer, which is executing programming software, and the version numbers of the programming hardware and programming software are unequal or incompatible. For example, programming hardware may be transferred from one host computer, which is executing one version of the programming software, to a second host computer, which is executing an older version of the programming software. The second host computer may subsequently "update" the programming hardware with an older revision of the configuration data. That is, as described herein, an update of the programming hardware may include replacing the current version of the configuration data with an older version, or with a version having fewer features. For example, the programming hardware may be "updated" in this manner in order to provide compatibility with various PLD targets and software versions, or to alter the set of features available based on a user's authorization level. Each time communication is established between the programmer software and the programmer hardware, the programmer software may query (with steps similar to steps 406 and 408 discussed below) a programmer hardware revision number, such as a USERCODE of a PLD of the programmer hardware, to determine whether the revision numbers of the programmer software and the programmer hardware are compatible.

The updated configuration data may have a format needing interpretation, such as SVF or XSVF, or may be the actual configuration data to be programmed into the PLD of the programming hardware. For configuration data needing interpretation, the programming software of the host computer may implement an interpreter function to interpret the configuration data.

At step 406, the programming software of the host computer enables an update mode of the programmer hardware to obtain access to a programming interface of the PLD of the programmer hardware. The host computer performs a configuration access to obtain the IDCODE and USERCODE of the PLD in the programmer hardware at step 408. At step 410, the IDCODE is checked to confirm the PLD has the expected type and the USERCODE is checked to confirm the existing programmed configuration for the PLD has the expected function and an appropriate revision number.

At step 412, the PLDs of the programming hardware are programmed with the updated configuration data by the host computer. At step 414 in one embodiment, the host computer performs a configuration access to obtain the value of a status register in the PLD of the programming hardware to verify successful programming of the PLD. The status register may reflect a CRC calculation over the programmed configuration data received by the PLD. At step 414 in another embodiment, the host computer verifies successful programming of the PLD by reading the programmed configuration back from the PLD.

The status result is checked at step 416. For successful programming of the PLD in the programming hardware, the process 400 proceeds to step 418 and the host disables update mode causing the programming hardware to resume normal operating mode. For unsuccessful programming of the PLD in the programming hardware, the process 400 proceeds to step 420 with user notification of the unsuccessful programming.

At step 422, the programming hardware is restored to the condition prior to the unsuccessful programming attempt. In one embodiment, an existing programmed configuration of the PLD in the programming hardware is read before the programming attempt with the updated configuration, and the existing programmed configuration of the PLD is restored by another programming of the PLD. In another embodiment, the programming hardware contains redundant PLD, with one PLD active and another PLD inactive with pins in a high impedance state. During programming update, the inactive PLD is programmed. If programming is successful the active PLD becomes inactive, and the inactive PLD becomes active. For unsuccessful programming, the active PLD remains active and the inactive PLD remains inactive. Finally, for unsuccessful programming the update mode may be disabled at step 418.

Figure 5:
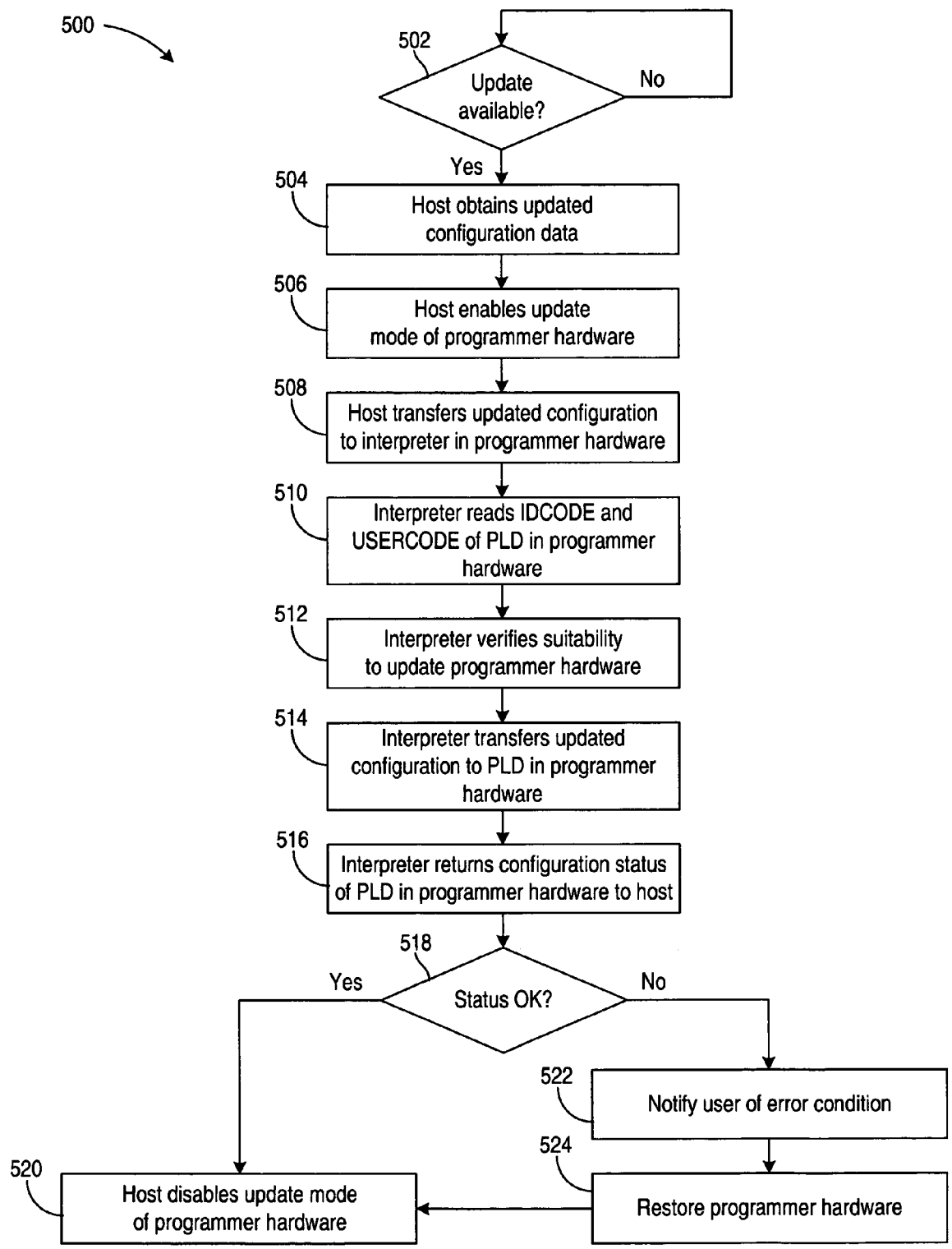
FIG. 5 is a flow diagram of a process for configuring programmer hardware by an interpreter in the programmer hardware, in accordance with one or more embodiments of the invention.

FIG. 5 is a flow diagram of a process 500 for configuring programmer hardware by an interpreter in the programmer hardware, in accordance with one or more embodiments of the invention. Programmer software on a host computer sends the configuration data to an interpreter in the programmer hardware, and the interpreter programs the PLD in the programmer hardware.

At step 502, the programmer software executing on the host computer determines an updated configuration is available in a manner similar to process 400 of FIG. 4. At step 504, the host computer obtains the updated configuration data. The host computer enables update mode of the programmer hardware at step 506, permitting the host computer to transfer the updated configuration data to the interpreter in the programmer hardware at step 508.

At step 510, the interpreter may be directed by the configuration data to read the IDCODE and USERCODE of the PLD in the programmer hardware. The interpreter verifies the suitability to update the programmer hardware based on the IDCODE and USERCODE at step 512. When the IDCODE indicates the proper PLD device type and the USERCODE indicates the proper programmed function and appropriate revision code for the PLD, the interpreter programs the PLD in the programmer hardware with the updated configuration at step 514.

At step 516, the interpreter may be directed by the configuration data to read a status register or a CRC result register in the PLD of the programmer hardware to determine whether programming of the PLD was successful. The interpreter may provide the programming status to the host computer by implementing a host-accessible register that reflects the value of the PLD register.

At step 518, the host computer and possibly the interpreter may check the programming status result. For successful programming, process 500 proceeds to step 520 and the host computer disables update mode, causing the programming hardware to resume normal operating mode. For unsuccessful programming, process 500 proceeds to step 522 with the host computer notifying a user of the unsuccessful programming. At step 524, the configuration data may direct the interpreter to restore the programmer hardware to a backed-up state as previously discussed. For unsuccessful programming, the host computer may disable update mode of the programmer hardware at step 520.

The present invention is believed to be applicable to a variety of systems for programming a PLD and is thought to be particularly applicable and beneficial in changing the configuration of a programmer used to configure a PLD. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for programming a first programmable device by a programmer, the programmer including a software component executing on a host processor and a hardware component coupled to the host processor, the method comprising:

determining availability of updated configuration data for the hardware component by the software component of the programmer in response to establishment of communication between the hardware component of the programmer and the first programmable device;

enabling an update mode of the hardware component in response to availability of the updated configuration data;

disabling the hardware component from programming the first programmable device in response to the update mode being enabled;

programming at least one second programmable device internal to the hardware component with the updated configuration data while the hardware component is in the update mode;

disabling the update mode of the hardware component in response to completion of the programming of the at least one second programmable device; and programming the first programmable device by the programmer having the updated configuration data, wherein the first programmable device is external to the hardware component.

2. The method of claim 1, further comprising:

verifying authorization for the enabling of the update mode;

wherein enabling the update mode includes enabling the update mode in response to authorization being verified; and denying the enabling of the update mode in response to authorization being denied.

3. The method of claim 2, wherein the verifying authorization includes verifying whether a payment was made for the updated configuration data for use in a particular programmer.

4. The method of claim 2, wherein the verifying authorization includes checking a password associated with a particular programmer.

5. The method of claim 1, further comprising:

reading a value from a register in the at least one second programmable device internal to the hardware component;

determining whether the value is compatible with the updated configuration data; and denying the enabling of the update mode in response to the value being incompatible with the updated configuration data.

6. The method of claim 5, wherein the value indicates a type of the at least one second programmable device internal to the hardware component.

7. The method of claim 5, wherein the value indicates functionality of a current configuration of the at least one second programmable device internal to the hardware component.

8. The method of claim 7, further comprising updating the register with an updated value that indicates functionality of the updated configuration data in response to the programming of the at least one second programmable device internal to the hardware component with the updated configuration data.

9. The method of claim 5, wherein the value is a first value and the register is a first register, the method further comprising:

reading a second value from a second register in the at least one second programmable device internal to the hardware component;

determining whether the second value is compatible with the updated configuration data; and denying the enabling of the update mode in response to the second value being incompatible with the updated configuration data.

10. The method of claim 9, wherein the first value indicates a type of the at least one second programmable device internal to the hardware component, and the second value indicates functionality of a current configuration of the at least one second programmable device internal to the hardware component.

11. The method of claim 9, wherein the updated configuration data includes operation codes for controlling configuration of the at least one second programmable device and the method further comprising:

interpreting the operation codes specified in the updated configuration data in the programmer; and in response to the operation codes performing the reading the first and second values from the first and second registers, the determining compatibility of the first and second values, and the denying the enabling of the update mode in response to the first and second values being incompatible with the updated configuration data.

12. The method of claim 1, further comprising obtaining the updated configuration data via a network connection.

13. The method of claim 1, wherein the updated configuration data is formatted in a serial vector format.

14. The method of claim 1, further comprising:
determining availability of updated software for the software component of the programmer by the software component; and
updating the software component with the updated software in response to the availability of updated software.

15. The method of claim 1, further comprising establishing an interface between the hardware component of the programmer and the target first programmable device in an inactive state in response to the enabling of the update mode.

16. The method of claim 1, further comprising:
determining whether the programming of the at least one second programmable device internal to the hardware component with the updated configuration data was successful; and
restoring the at least one second programmable device to a backup configuration in response to failure of the programming of the at least one second programmable device internal to the hardware component with the updated configuration data.

17. The method of claim 16, further comprising storing as the backup configuration a current configuration of the at least one second programmable device before programming the at least one second programmable device with the updated configuration data.

18. The method of claim 16, further comprising storing as the backup configuration a configuration having a subset of the functionality implemented by the updated configuration data.

19. The method of claim 16, wherein the programming the at least one second programmable device comprises programming a redundant programmable device internal to the hardware component, and
wherein restoring the at least one second programmable device to a backup configuration comprises establishing the redundant programmable device as inactive.

20. The method of claim 16, further comprising storing a status code in a status register in the at least one second programmable device in response to the programming of the at least one second programmable device, wherein a value of the status code indicates whether the programming was successful.

21. The method of claim 16, wherein the determining successful programming includes performing a cyclic redundancy check of the updated configuration data received at the at least one second programmable device.

22. An apparatus for programming a first programmable device, comprising:
a software component executing on a host processor;
a hardware component coupled to the host processor;
means for determining availability of updated configuration data for the hardware component by the software component in response to establishment of communication between the hardware component and the first programmable device;
means for enabling an update mode of the hardware component in response to availability of the updated configuration data;
means for disabling the hardware component from programming the first programmable device in response to the update mode being enabled;
means for programming at least one second programmable device internal to the hardware component with the updated configuration data while the hardware component is in the update mode;
means for disabling the update mode of the hardware component in response to completion of programming of the at least one second programmable device; and
means for programming the first programmable device including the updated configuration data, wherein the first programmable device is external to the hardware component.

23. A system for programming a first programmable device, comprising:
a software component adapted to execute on a host computer;
a hardware component coupled to the software component and operable in one of an update mode and a normal mode responsive to control from the software component, the hardware component including,
at least one second programmable device adapted for programming by the software component in response to the hardware component operating in the update mode;
a target interface coupled to the at least one second programmable device and adapted to couple to the first programmable device, the target interface being further adapted to enable passing of configuration data to the first programmable device in response to the hardware component operating in normal mode and disable passing of the configuration data in response to the hardware component operating in update mode; and
a path selector coupled to the software component, the at least one second programmable device, and the target interface, the path selector adapted to provide the configuration data to the target interface via the at least one second programmable device in response to the hardware component operating in normal mode and provide the configuration data to the at least one second programmable device in response to the hardware component operating in update mode.

24. The system of claim 23, wherein the software component is configured to verify authorization for the enabling of the update mode, enable the update mode in response to authorization being verified, and deny the enabling of the update mode in response to authorization being denied.

25. The system of claim 23, wherein the updated configuration data includes operation codes for controlling configuration of the at least one second programmable device, and further comprising an interpreter coupled to the path selector and to the at least one second programmable device, the interpreter adapted, responsive to operation codes in the updated configuration data, to read a value from a register in the at least one second programmable device internal to the hardware component, to determine whether the value is compatible with the updated configuration data, and to deny the enabling of the update mode in response to the value being incompatible with the updated configuration data.

26. The system of claim 25, wherein the value indicates a type of the at least one second programmable device internal to the hardware component.

27. The system of claim 25, wherein the value indicates functionality of a current configuration of the at least one second programmable device internal to the hardware component.

28. The system of claim 27, wherein the interpreter is further adapted to update the register with an updated value that indicates functionality of the updated configuration data in response to the programming of the at least one second programmable device internal to the hardware component with the updated configuration data.

29. The system of claim 25, wherein the value is a first value and the register is a first register, wherein:
the interpreter is further adapted to read a second value from a second register in the at least one second programmable device internal to the hardware component, determine whether the second value is compatible with the updated configuration data, and deny the enabling of the update mode in response to the second value being incompatible with the updated configuration data.

30. The system of claim 29, wherein the first value indicates a type of the at least one second programmable device internal to the hardware component, and wherein the second value indicates functionality of a current configuration of the at least one second programmable device internal to the hardware component.

31. The system of claim 23, wherein the software component is adapted to retrieve the updated configuration data via a network connection.

32. The system of claim 23, wherein the updated configuration data is formatted in a serial vector format.

33. The system of claim 23, wherein the software component is further adapted to determine availability of updated software for the software component, and update the software component with the updated software in response to the availability of updated software.

34. The system of claim 25, wherein the interpreter is further adapted to store a status code in a status register in the at least one second programmable device responsive to programming of the at least one second programmable device, wherein a value of the status code indicates whether the programming was successful.

35. The system of claim 23, wherein the at least one second programmable device comprises two redundant programmable devices, and
wherein only one of the two redundant programmable devices is active at a time.

* * * * *